March 23, 1937.  G. BEISSER  2,074,884
SCALE
Filed July 25, 1933  2 Sheets-Sheet 1

Inventor:
GEORG BEISSER, deceased
By CHARLOTTE BEISSER, administratrix

By: Glascock Downing & Seebold
Attorneys

March 23, 1937.  G. BEISSER  2,074,884
SCALE
Filed July 25, 1933   2 Sheets-Sheet 2

Inventor:
Georg Beisser (Deceased) by
Charlotte Beisser (Administratrix)
By: Glascock Downing Seebok
Attys.

Patented Mar. 23, 1937

2,074,884

UNITED STATES PATENT OFFICE 2,074,884

SCALE

Georg Beisser, deceased, late of Hamburg-Rahlstedt, Germany, by Charlotte Beisser, administratrix, Hamburg-Rahlstedt, Germany Application July 25, 1933, Serial No. 682,156
In Germany June 24, 1930

4 Claims. (Cl. 116—129)

Weighing devices for automatically measuring the weight of the pickling brine to be supplied to meat for the purpose of pickling the latter are already well known. In these devices the shutting off of the supply of brine is effected automatically as soon as the weight of brine introduced together with the original weight of the meat has attained a certain ratio to said original weight. These devices which act automatically are however comparatively complicated and therefore expensive, so that their introduction into small works is rendered difficult. On the other hand a simple balance cannot be employed for determining the weight of the brine introduced because the weights of the original meat vary and unskilled picklers cannot be expected to perform at the requisite speed and with the necessary accuracy the calculations required for the determination of the weight of the brine to be introduced. Moreover tables do not solve the difficulty because they become too cumbersome and difficult to consult if compiled for weights differing by very small amounts and moreover in the case of errors made on consulting said tables the pieces of meat treated would be rendered useless either through being oversalted or through being spoilt in consequence of having insufficient brine supplied to them. For the purpose of doing away with these difficulties it is proposed according to the present invention to provide a weighing device for automatically indicating the weight of the pickling brine to be supplied to the meat for the purpose of pickling the latter with a scale having graduations by means of which the ratio of the original weight of the meat to the sum of the weights of the meat and of the pickling brine is determined and can be read off with the aid of a pointer indicating the weight.

The drawings show by way of example one embodiment of the invention.

Fig. 1 represents the form of graduated scale, by means of which the ratio of the original weight of the meat to the sum of the weights of the meat and of the pickling brine is determined and can be read off by means of the pointer giving the original weight.

Fig. 2 shows the entire arrangement of the device.

Figure 1:
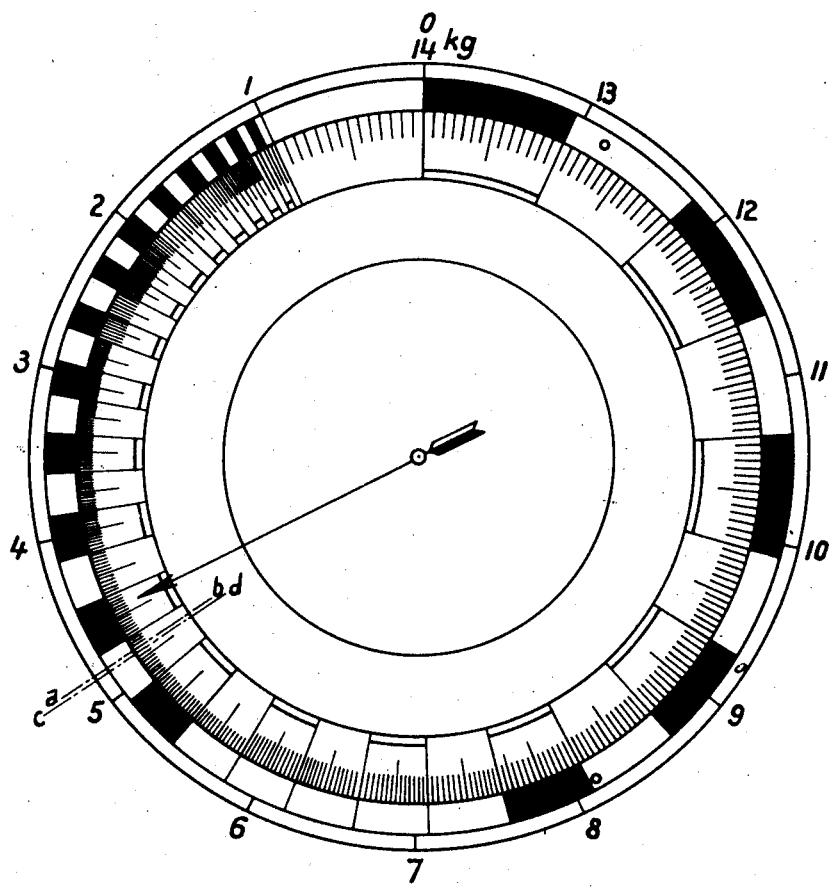
Figure 1 is a front elevation of the graduated scale alone.
Figure 2:
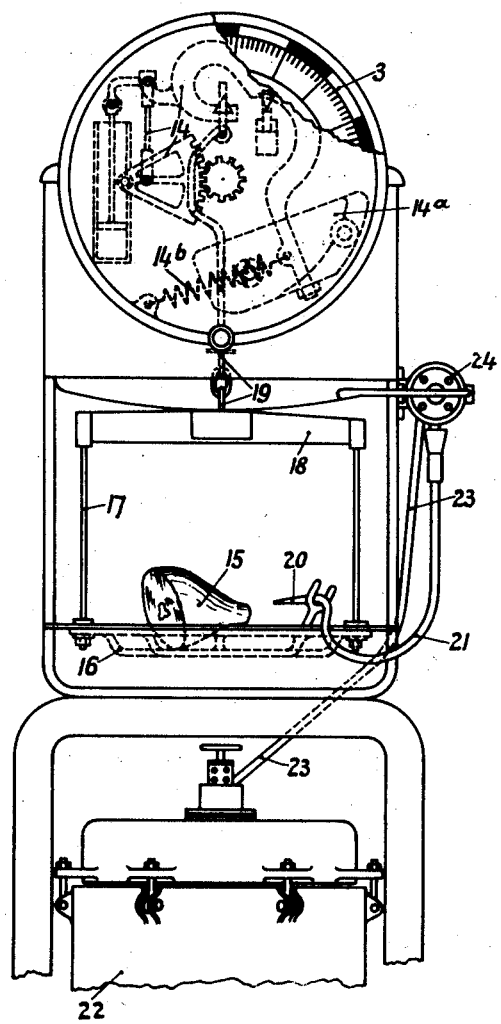
Fig. 2 is a front elevation exposing the detail elements of the interior with said scale removed.

Numeral 14 indicates the weighing mechanism which is arranged behind the scale 3. 2 indicates the weight pointer for the weight of the original meat, the said pointer moving on the scale 3 according to Figure 1. The scale may be formed either as a weight scale with the weight 14a or as a spring balance with the spring 14b. The piece of meat 5 to be pickled is placed on the plate 16 of the weighing apparatus the said plate being suspended from the weighing mechanism 14 at 19 by means of the rods 17 and the member 18. The weight of the parts 16, 17, 18 and 19 is accounted for by adjusting the weighing mechanism 14 so that it moves to zero when the plate of the weighing apparatus is unloaded. The weight of the nozzle 20 for pickling brine and of the feed tube 21 is also accounted for by adjusting the weighing mechanism 14. When the piece of meat 15 is placed on the plate 16, the pointer 2 indicates only the weight of this piece of meat. The pickling brine is contained in the pressure tank 22. The pickling brine is supplied to the piece of meat 15 through tube 21, conduit 23 and hand-operated valve 24. If when placing the untreated piece of meat 5 on the weighing plate 16, the weight pointer 2 moves over a certain area or field of the scale according to Figure 1, it is only necessary to supply so much brine by operating the valve 24 that the pointer 2 moves to the corresponding division of the next area or field. In this case, the amount of pickling brine is supplied to the piece of meat 5 which is sufficient for preservation on the one hand and for preventing an oversalting of the meat on the other hand. The superfluous brine may be discharged over the plate 16 of the weighing apparatus.

The absolute weight graduation arranged on the outer circumference of the circular scale according to Fig. 1 is meaningless for a weighing device for automatically giving the weight of the pickling brine to be supplied to meat for the pickling of the same and has been emphasized only to show that the graduation begins at 1 kg. because parts of an animal of less weight than this are not usually treated. Over this scale there moves a pointer indicating the weight. The scale graduation, over which the pointer moves is moreover such that the ratio of the original weight of the meat to the sum of the weights of the meat and of the pickling brine is determined with the aid of scale areas or fields rendered conspicuous in different ways and can therefore be read off with the aid of the weight indicator. Thus the weight indicator has by way of example been drawn in a position in which it is on the fourth division of a scale area exhibited in black.

In consequence of the scale graduation the fourth division of the next area (line $a$—$b$) corresponds to the weight of the original meat, which is indicated by means of the position of the pointer, with the addition of the weight of brine to be supplied for the adequate pickling of this weight of original meat, which weight of brine amounts in the example always to 7 per cent of the weight of the original meat. Consequently, when the pointer comes to rest at a certain weight division, the operator who uses the device requires merely to look for or to note the corresponding weight division on the next area. If he then admits the brine and stops the supply at the moment at which the weight indicator comes over said weight division in the next area, he has introduced the correct weight of brine.

The scale in the example possesses moreover the special peculiarity that each half area is divided into seven parts. If the pickler is instructed to supply to the parts of the animal to be treated brine in weight equal to say 8 per cent of the original weight of the parts, he introduces brine until the weight indicator rests on the fifth graduation of the weight area (line $c$—$d$).

It has already been mentioned that the settings of the scale co-ordinated to one another are coloured black and white in alternate areas, in order to facilitate the ascertaining of the co-ordinated setting of the weight indicator and of the scale graduation. This rendering conspicuous of the areas may of course be effected in any other manner, for example, by employing raised or sunk impressions, for these areas, by illuminating or not illuminating individual areas, or by in any other manner producing a result perceptible to human sense organs.

What is claimed is:

1. Apparatus for determining those varying quantities of pickling brine which are to be supplied to pieces of meat of varying weight in order to preserve the meat, comprising a weighing device consisting of means for supporting the material to be weighed, the weight scale and a pointer indicating the weight, and also comprising means, whose distance, from the said weight pointer in the position in which said weight pointer indicates the weight of the piece of meat before the introduction of the brine, automatically corresponds to the weight which is to be supplied to the weighed piece of meat in order to preserve the same, said last named means being stationary at least during the introduction of the brine, said stationary means being adapted to indicate the weight of brine to be added, said scale being divided into zones, graduation marks in each of the said zones, the distance of the graduation marks of each zone from the graduation marks of the next zone corresponding to the weight of the brine which is necessary for preserving that piece of meat whose weight is indicated by the graduation marks of the first zone.

2. Apparatus for determining the pickling brine required for pickling meat comprising a weighing device, consisting of means for receiving the material to be weighed, a pointer for indicating the actual weight of this material and a weight or spring loaded mechanism for transmitting the movement of the part of the weighing device for receiving the material to be weighed to said pointer, a scale over which the weight pointer moves, said scale divided into zones, graduation marks in each of the said zones, each of the said zones being longer than the preceding zone to a certain extent in the direction of movement of the weight pointer, the distance of the said graduation marks in each of the said zones from each other being greater to a certain extent than the distance of the graduation marks of the preceding zone, the ratio between the lengths of the individual zones and the distances of the individual graduation marks corresponding to the ratio between the weight of the piece of meat including the weight of brine and the weight of the piece of meat before the introduction of the brine which is required for preserving the meat.

3. Apparatus for determining the pickling brine required for pickling meat comprising a weighing device, consisting of means for receiving the material to be weighed, a pointer for indicating the actual weight of this material and a weight or spring loaded mechanism for transmitting the movement of the part of the weighing device for receiving the material to be weighed to said pointer, a scale over which the weight indicator moves, said scale divided into zones, graduation marks in each of the said zones, the distance of the graduation marks of each (first) zone from the graduation marks of the next (second) zone corresponding to the weight of brine which is required for preserving the piece of meat, whose weight will be indicated by the graduation marks of the first zone, said zones being designed differently in a manner perceptible to human sense organs.

4. Apparatus for determining the pickling brine required for pickling meat comprising a weighing device, consisting of means for receiving the material to be weighed, a pointer for indicating the actual weight of this material and a weight or spring loaded mechanism for transmitting the movement of the part of the weighing device for receiving the material to be weighed to said pointer, a scale over which the weight indicator moves, said scale divided into zones, graduation marks in each of the said zones, the distance of the graduation marks of each zone from the graduation marks of the next zone corresponding to the weight of brine which is required for preserving the piece of meat whose weight will be indicated by the graduation marks of the first zone, said zones being designed differently in a manner perceptible to human sense organs, the zones designated with even numbers and with odd numbers being of the same design.

CHARLOTTE BEISSER,
*Administratrix of Georg Beisser, Deceased.*